(12) United States Patent
Toda et al.

(10) Patent No.: US 9,223,093 B2
(45) Date of Patent: Dec. 29, 2015

(54) CONNECTOR

(71) Applicant: Japan Aviation Electronics Industry, Limited, Tokyo (JP)

(72) Inventors: Takeo Toda, Tokyo (JP); Hideto Shimazu, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 101 days.

(21) Appl. No.: 13/875,557

(22) Filed: May 2, 2013

(65) Prior Publication Data

US 2013/0301993 A1    Nov. 14, 2013

(30) Foreign Application Priority Data

May 10, 2012    (JP) ................................. 2012-108809

(51) Int. Cl.
*G02B 6/02*    (2006.01)
*G02B 6/36*    (2006.01)
*G02B 6/38*    (2006.01)
*G02B 6/42*    (2006.01)

(52) U.S. Cl.
CPC ................ *G02B 6/36* (2013.01); *G02B 6/3887* (2013.01); *G02B 6/4246* (2013.01); *G02B 6/4292* (2013.01); *G02B 6/3893* (2013.01); *G02B 6/3894* (2013.01)

(58) Field of Classification Search
CPC ........................................................ G02B 6/02
USPC ...................................................... 385/76, 14
See application file for complete search history.

(56) References Cited

U.S. PATENT DOCUMENTS

| 6,478,619 | B1 * | 11/2002 | Wiechmann | .................. | 439/587 |
|---|---|---|---|---|---|
| 2006/0171639 | A1 * | 8/2006 | Dye | ................................. | 385/78 |
| 2008/0050070 | A1 * | 2/2008 | Gurreri et al. | ................... | 385/55 |
| 2008/0175541 | A1 * | 7/2008 | Lu et al. | ........................... | 385/62 |
| 2008/0175542 | A1 * | 7/2008 | Lu et al. | ........................... | 385/62 |
| 2009/0148101 | A1 * | 6/2009 | Lu et al. | ........................... | 385/56 |
| 2009/0185777 | A1 * | 7/2009 | Ziemke et al. | ................... | 385/56 |

(Continued)

FOREIGN PATENT DOCUMENTS

| JP | 2006-011102 | 1/2006 |
|---|---|---|
| JP | 2010-108629 | 5/2010 |

(Continued)

OTHER PUBLICATIONS

Office Action issued in Japan family member Patent Appl. No. 2012-108809, dated Oct. 13, 2015, along with an English translation thereof.

*Primary Examiner* — Kaveh Kianni
(74) *Attorney, Agent, or Firm* — Greenblum & Bernstein, P.L.C.

(57) ABSTRACT

A receptacle includes a hollow cylinder and a flange. A plug includes a barrel having a cylindrical body, a semicylindrical section extending from the body, and an engaging section provided at an end of the semicylindrical section and a coupling nut. A boom-like retaining piece is cut out and formed in the semicylindrical section and a retaining hook is formed at an idle end of the retaining piece located in the engaging section. The coupling nut is screwed onto threads of the hollow cylinder so that the plug is connected to the receptacle. Before the connection, the engaging section is engaged with and inserted into the hollow cylinder and the retaining piece is caught in the receptacle, so that the plug is temporarily retained to the receptacle securely.

17 Claims, 8 Drawing Sheets

(56) References Cited

U.S. PATENT DOCUMENTS

| | | | |
|---|---|---|---|
| 2010/0111477 A1* | 5/2010 | Strasser et al. | 385/56 |
| 2010/0165557 A1* | 7/2010 | Lapp | 361/679.01 |
| 2011/0003501 A1* | 1/2011 | Greub et al. | 439/359 |
| 2012/0141086 A1* | 6/2012 | Greub et al. | 385/139 |
| 2012/0181082 A1* | 7/2012 | Faulkner et al. | 174/75 R |
| 2013/0011102 A1* | 1/2013 | Rinzler et al. | 385/89 |

FOREIGN PATENT DOCUMENTS

| | | |
|---|---|---|
| JP | 2010-118224 | 5/2010 |
| JP | 2011-070191 | 4/2011 |
| JP | 2012-018253 | 1/2012 |

\* cited by examiner

CONNECTOR

TECHNICAL FIELD

The present invention relates to a connector including a plug and a receptacle and, more particularly, to a connector that can house a pair of internal connectors such as optical connectors connected to each other and forms an outer shell to protect the internal connectors.

BACKGROUND ART

Figure 1A:
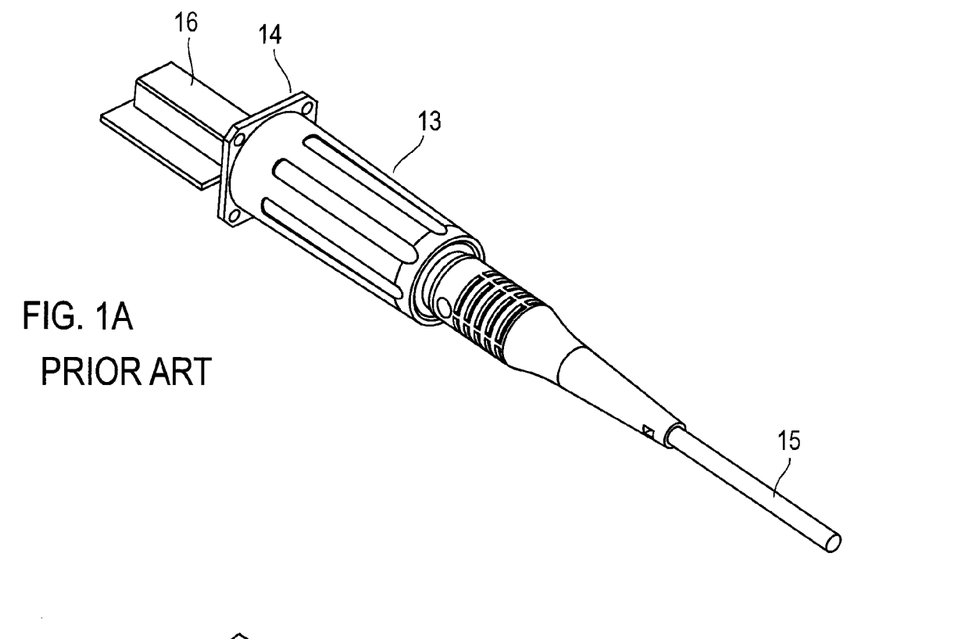
FIG. 1A is a perspective view illustrating a conventional connector.
Figure 1B:
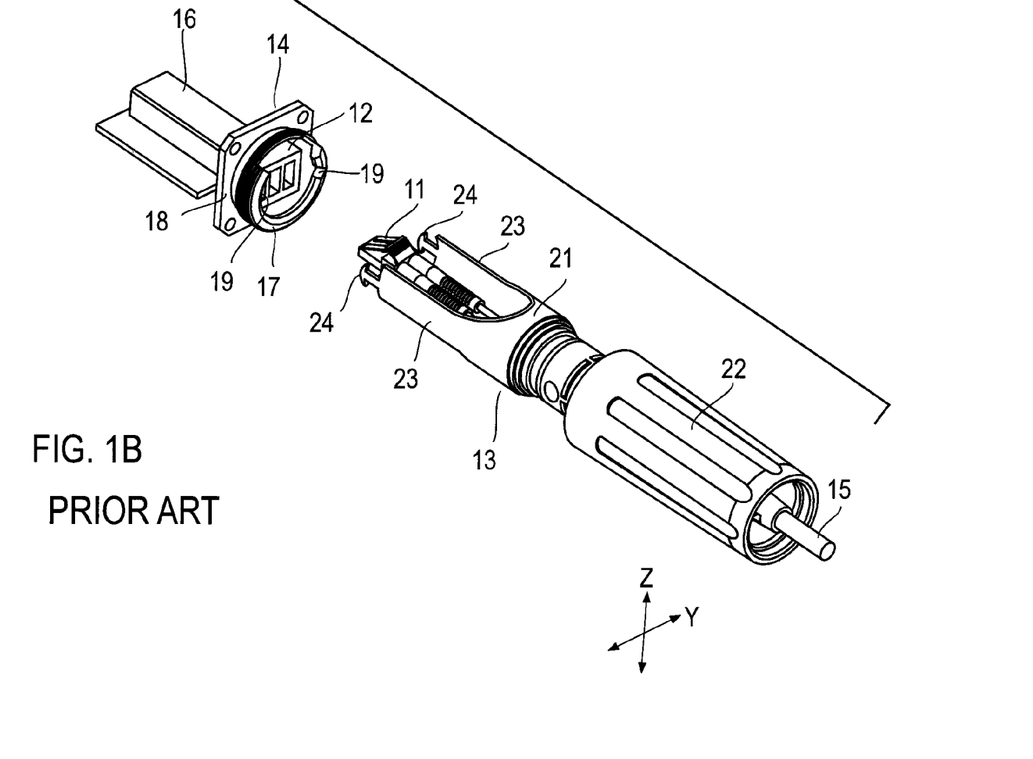
FIG. 1B is a perspective view illustrating the connector shown in FIG. 1A before being connected.

FIGS. 1A and 1B show the structure of the connector disclosed in U.S. Patent Application Publication No. 2011/0003501A. The reference numeral 11 in FIGS. 1A and 1B indicates an optical connector attached to an end of each of optical fibers and the reference numeral 12 indicates a counterpart optical connector to which the optical connector 11 is connected. The reference numeral 13 indicates a plug that houses the optical connector 11. The reference numeral 14 indicates a receptacle that houses the optical connector 12. The plug 13 and the receptacle 14 form the outer shells of the optical connectors 11 and 12, respectively. In FIGS. 1A and 1B, the reference numeral 15 indicates an optical cable and the reference numeral 16 indicates a transceiver to which the optical connector 12 is connected.

The receptacle 14 includes a hollow cylinder 17 and a flange 18 formed at one end of the hollow cylinder 17. Threads are formed in an outer circumference of the hollow cylinder 17 and depressions 19 are formed at two positions on an inner surface of the hollow cylinder 17.

The plug 13 includes a cylindrical body 21 and an external cylinder 22, which is placed external to the cylindrical body 21. Two boom-like arms 23 project from the cylindrical body 21. A retaining section 24 is provided at an end of each of the arms 23.

The plug 13 and the receptacle 14 are connected to each other when threads formed in an inner circumference at an end of the external cylinder 22 of the plug 13 are screwed onto the threads of the hollow cylinder 17 of the receptacle 14. At this time, the retaining sections 24 provided at the ends of the two arms 23 of the plug 13 are inserted into and caught in the depressions 19 of the hollow cylinder 17 of the receptacle 14.

In the above structure including the plug 13 and the receptacle 14, when the retaining sections 24 at the ends of the arms 23 of the plug 13 are caught in the receptacle 14, the arms 23 of the plug 13 can be retained to the receptacle 14 (that is, the plug 13 can be temporarily retained to the receptacle 14), thereby facilitating the connection of the optical connectors 11 and 12. Even when, for example, the receptacle 14 is attached to the ceiling etc. of a room and the plug 13 is connected to the receptacle 14 in a vertically upward direction, it is possible to prevent the optical connector 11 or the external cylinder 22 from being detached (falling) during insertion and connection of the optical connector 11 or screwing of the external cylinder 22.

A problem with the plug 13 shown in FIG. 1B is that a retaining strength is insufficient, so the retaining sections 24 are likely to be disconnected from the receptacle 14 when an external force is applied specially in the upward/downward direction (Z-direction), which is orthogonal to the left/right direction (Y-direction), in which the retaining sections 24 face each other, because the number of retaining sections 24 that face each other in the hollow cylinder 17 of the receptacle 14 is two, the retaining sections 24 are retained only by being caught in the receptacle 14, and the arms 23 are too long.

SUMMARY OF THE INVENTION

An object of the present invention is to provide a connector that has an improved retaining strength during temporary retaining as compared with the related art by temporarily retaining the plug to the receptacle securely before the plug is screwed onto and connected to the receptacle.

According to the present invention, a connector includes a plug capable of housing one internal connector as an outer shell and a receptacle capable of housing another internal connector as an outer shell, the plug and the receptacle being connected to each other, the one internal connector and the other internal connector being connected to each other, in which the receptacle includes a hollow cylinder and a flange formed at one end of the hollow cylinder, the plug includes a barrel having a cylindrical body, a semicylindrical section extending from the body, the semicylindrical section shaped by partially cutting out a cylinder of the body, and an engaging section provided at an end of the semicylindrical section and a coupling nut mounted on an outer circumference of the barrel, the coupling nut movable in an axial direction of the barrel, in which a boom-like retaining piece having a fixed end on a side of the body is cut out and formed in the semicylindrical section, a retaining hook is formed at an idle end of the retaining piece located in the engaging section, the retaining hook projecting on a side of an outer circumference of the engaging section, the plug and receptacle are connected to each other when the coupling nut is screwed onto threads formed on an outer circumference of the hollow cylinder, and the engaging section is engaged with and inserted into the hollow cylinder so as to be positioned on an inner surface of the hollow cylinder before the plug and receptacle are connected and the retaining piece is caught in the receptacle by the retaining hook, so that the plug is temporarily retained to the receptacle.

In the connector according to the present invention, the plug can be temporarily retained to the receptacle securely before the plug is screwed onto and connected to the receptacle. This completely prevents the plug from being disconnected (falling) by an unexpected external force even when, for example, the plug is connected to the receptacle in a vertically upward direction, thereby making the connection of the internal connectors and the screwing of the plug easy and safe.

DETAILED DESCRIPTION OF THE EMBODIMENTS

An embodiment of the present invention will be described below.

Figure 2A:
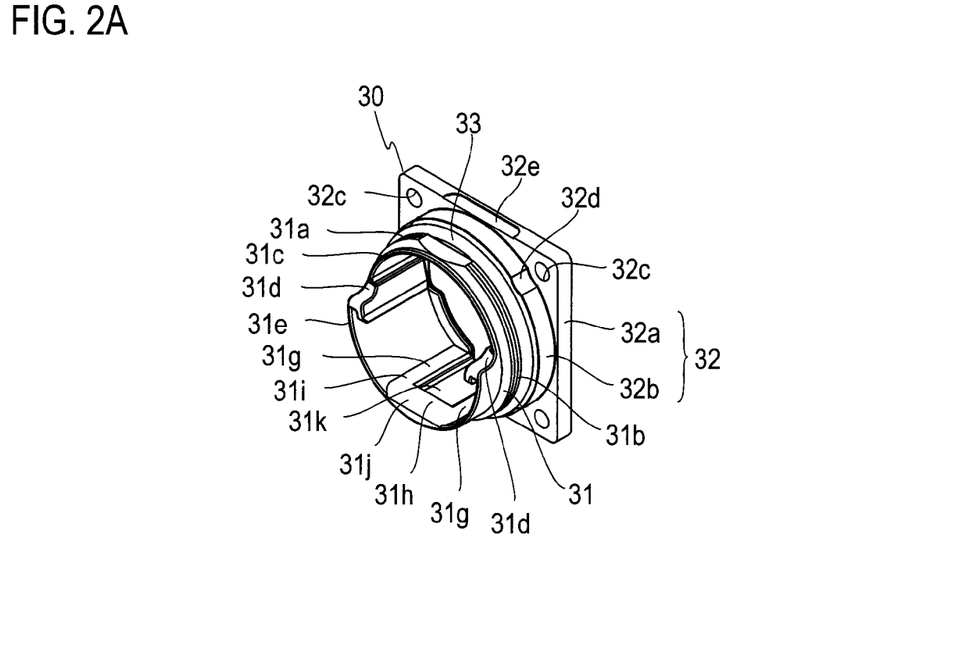
FIG. 2A is a perspective view illustrating a receptacle of a connector according to an embodiment of the present invention.
Figure 2B:
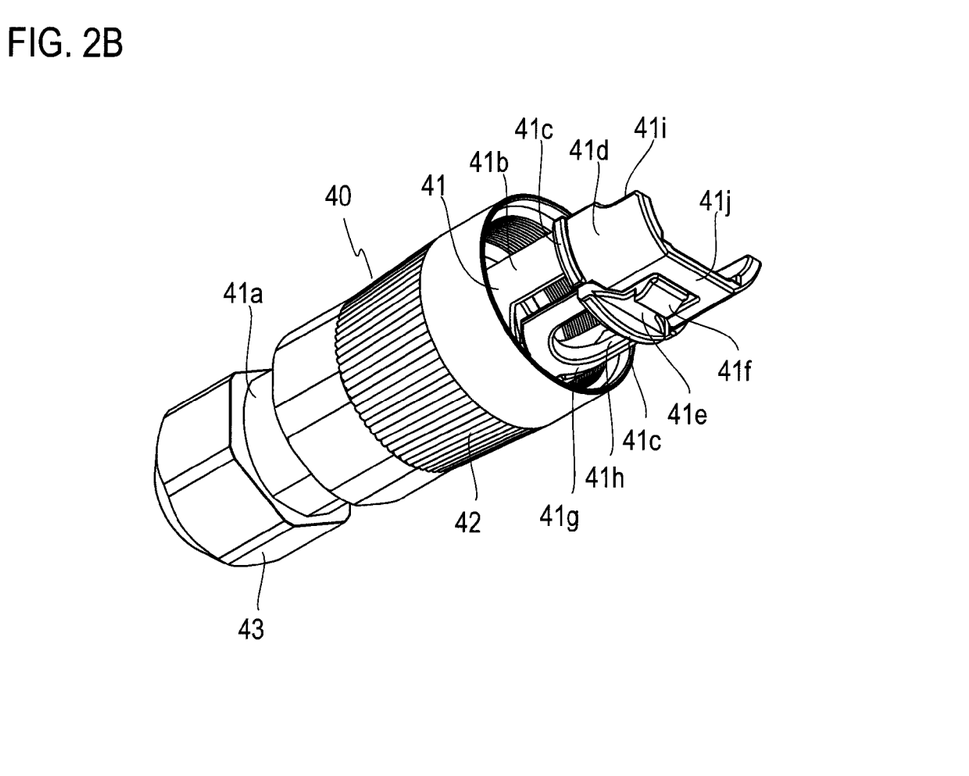
FIG. 2B is a perspective view illustrating a plug of the connector according to the embodiment of the present invention.

FIGS. 2A and 2B show the appearance of a receptacle and a plug included in a connector according to the present invention. FIGS. 2A and 2B do not show internal connectors housed in the receptacle and the plug. FIGS. 3A to 3G show the shape of the receptacle and FIGS. 4A to 4C and FIGS. 5A to 5C show the shape and sectional structure of the plug.

The receptacle 30, made of metal, includes a hollow cylinder 31 and a flange 32 formed at one end of the hollow cylinder 31. The flange 32 includes a square portion 32a and a circular portion 32b, which is placed inward of the square portion 32a. A through hole 32c is present at each of the four corners of the square portion 32a and arc-shaped depressions 32d are disposed in four positions in an outer circumferential surface of the circular portion 32b so as to correspond to the positions of the through holes 32c.

A groove 31a is formed annularly in an outer circumferential surface of the hollow cylinder 31 next to the circular portion 32b, and threads 31b are formed next to the groove 31a. The outer diameter of a part of the hollow cylinder 31 ahead of the threads 31b is a little smaller and the end of the hollow cylinder 31 is largely cut out by a cutout 31c upward.

Figure 3A:
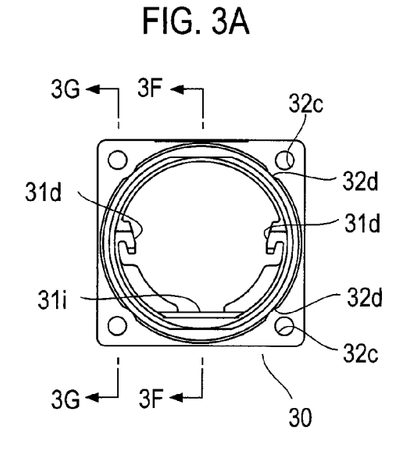
FIG. 3A is a front elevational view illustrating the receptacle shown in FIG. 2A.
Figure 3B:
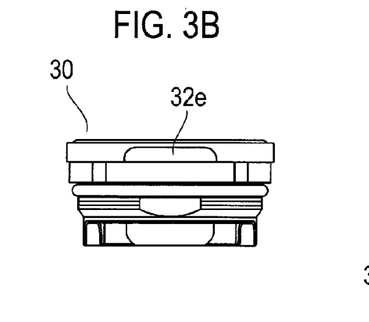
FIG. 3B is a plan view illustrating the receptacle shown in FIG. 2A.
Figure 3C:
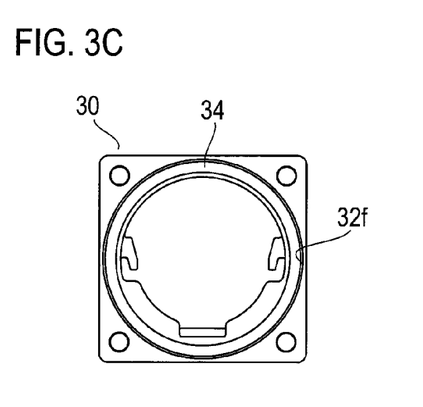
FIG. 3C is a rear elevational view illustrating the receptacle shown in FIG. 2A.
Figure 3D:
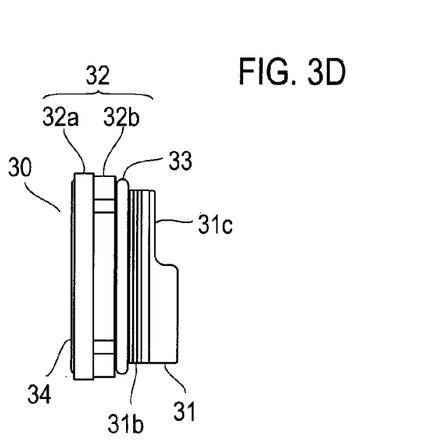
FIG. 3D is a side view illustrating the receptacle shown in FIG. 2A.
Figure 3E:
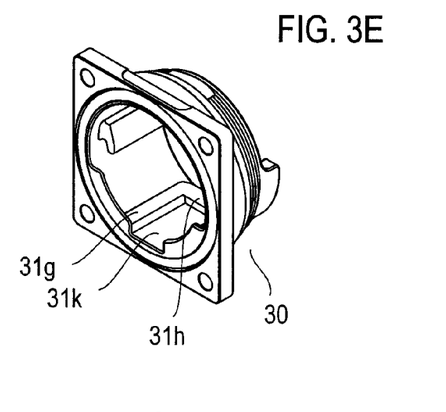
FIG. 3E is a perspective view illustrating the receptacle shown in FIG. 2A.
Figure 3F:
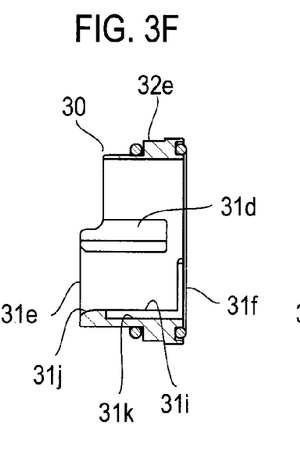
FIG. 3F is a cross-sectional view taken from line 3F-3F in FIG. 3A.
Figure 3G:
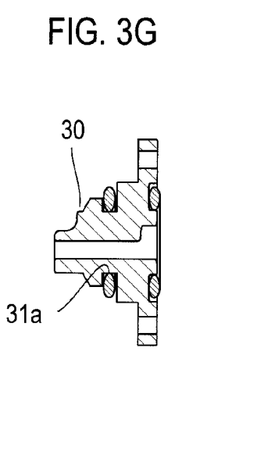
FIG. 3G is a cross-sectional view taken from line 3G-3G in FIG. 3A.

Projecting sections 31d are formed at two positions in a circumferential direction of the inner surface of the hollow cylinder 31. The projecting sections 31d are located at both ends of the cutout 31c of the hollow cylinder 31 and, in this example, the projecting sections 31d face each other (the angle formed by the projecting sections 31d is 180°). The projecting sections 31d have a hook-shaped cross-section and its edge is bent in a direction opposite to the cutout 31c. The projecting sections 31d extend in the axial direction from an end surface 31e to a vicinity of a rear end surface 31f of the hollow cylinder 31 and, on a side (side close to the rear end surface 31f) away from the cutout 31c, the width in the circumferential direction of a part connecting to the inner surface of the hollow cylinder 31 is wide.

Two ridges 31g and a coupling section 31h are further formed on the inner surface of the hollow cylinder 31. The two ridges 31g are formed in positions facing the cutout 31c in parallel with each other so as to extend the axial direction of the hollow cylinder 31. The two ridges 31g are coupled by a coupling section 31h at the end of the hollow cylinder 31. The upper surfaces of the two ridges 31g and an upper surface of the coupling section 31h form a single plane 31i and an inclined plane 31j is formed at an end (on a side of the end surface 31e of the hollow cylinder 31) of the plane 31i. The area surrounded by the two ridges 31g and the coupling section 31h is a recessed section 31k.

The receptacle 30 is mounted on, for example, a panel. by screwing the square portion 32a of the flange 32. A screw is inserted through each of the fours through holes 32c at four corners and screwed into the panel. The depressions 32d disposed in the circular portion 32b function as escapes for screws. A marker 32e is provided on the side corresponding to the position of the cutout 31c of the hollow cylinder 31 among the four sides of the square portion 32a. The marker 32e in this example is a shallow depression with a shape as shown in FIGS. 2A and 3B.

O-rings 33 and 34 are placed on the receptacle 30. The O-ring 33 is placed in a groove 31a at the base of the hollow cylinder 31 and the O-ring 34 is placed in a groove 32f, concentric with the hollow cylinder 31, that is formed in the back surface of the flange 32. The O-ring 34 is sandwiched between the panel and the flange 32 when the flange 32 is mounted on the panel etc.

The plug 40 in this example includes a barrel 41, a coupling nut 42, a clamp nut 43, an O-ring 44, and a cable seal 45. The barrel 41 and the clamp nut 43 are made of resin and the coupling nut 42 is made of metal.

The barrel 41 includes a cylindrical body 41a and a semi-cylindrical section 41b that is shaped by partially cutting out a cylinder of the cylindrical body 41a and extends from the cylindrical body 41a. An annular ridge 41c is formed on an outer circumferential surface of the semicylindrical section 41b so as to extend in the circumferential direction. The part of the semicylindrical section 41b ahead of the annular ridge 41c is an engaging section 41d.

Figure 4A:
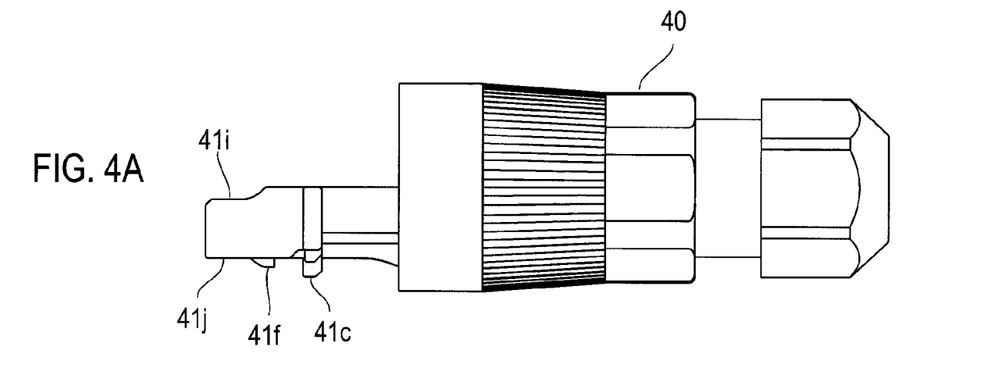
FIG. 4A is a front elevational view illustrating the plug shown in FIG. 2B.
Figure 4B:
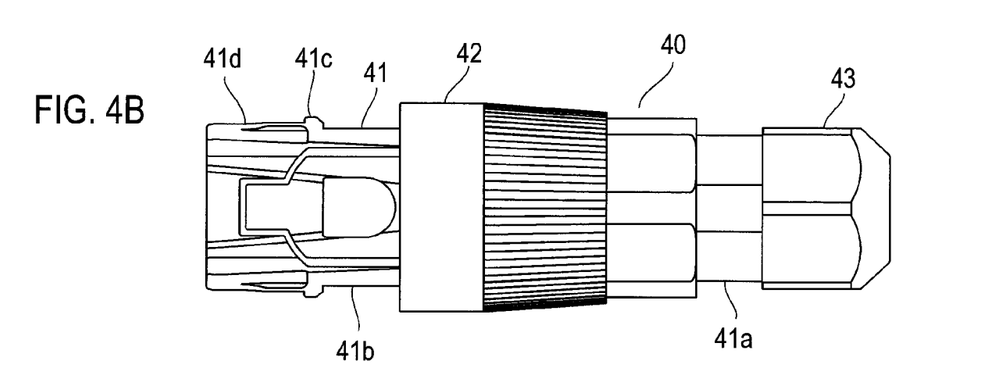
FIG. 4B is a plan view illustrating the plug shown in FIG. 2B.
Figure 5A:
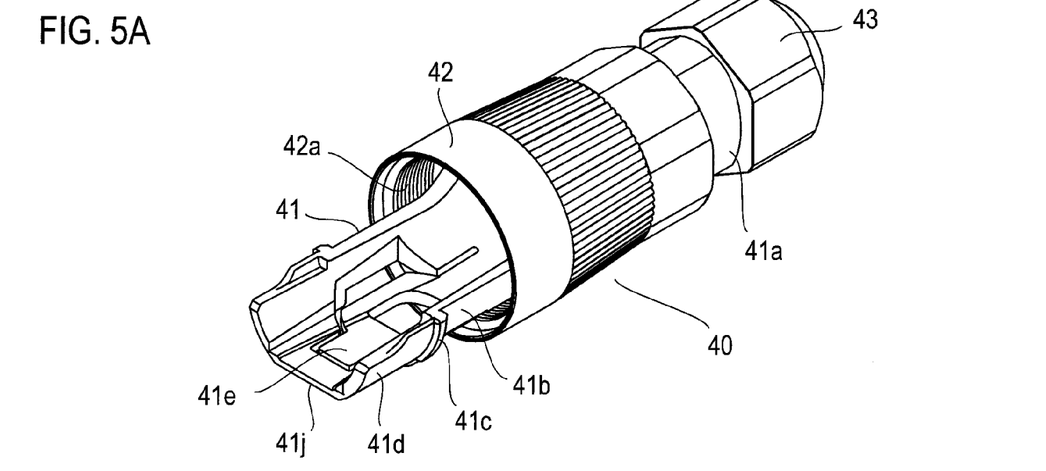
FIG. 5A is a perspective view illustrating the plug shown in FIG. 4A.

A boom-like retaining piece 41e having a fixed end on a side of the cylindrical body 41a is cut out and formed in the semicylindrical section 41b and a retaining hook 41f projecting from an outer circumference of the engaging section 41d is formed at an idle end of the retaining piece 41e located in the engaging section 41d. A wide area 41g is present an intermediate part in the extending direction of the retaining piece 41e and the annular ridge 41c is located on the side of an idle end of the wide area 41g. A large window 41h is formed in the wide area 41g of the retaining piece 41e between the annular ridge 41c and the fixed end.

Figure 4C:
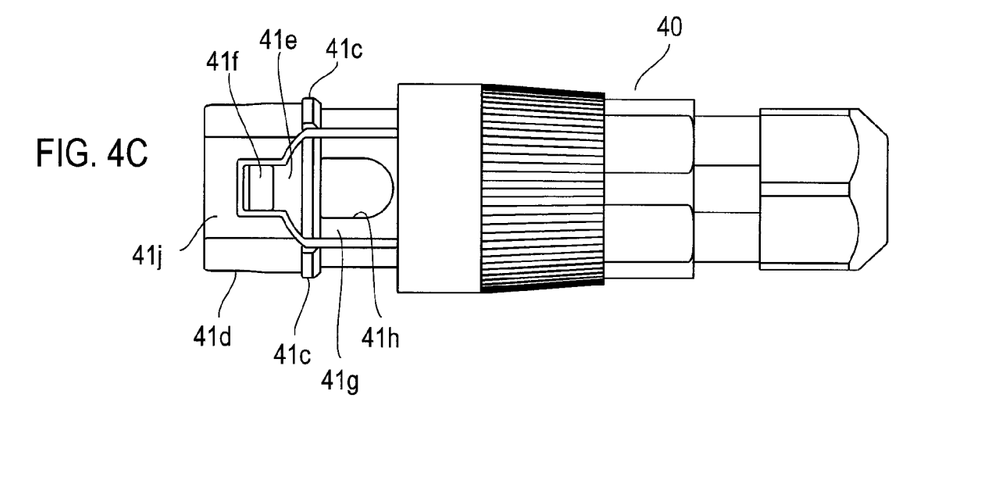
FIG. 4C is a bottom view illustrating the plug shown in FIG. 2B.

The semicylindrical section 41b in this example is substantially semicylindrical and largely opened upward. A cutout 41i is formed at each of both ends in the circumferential direction at the end of the engaging section 41d at the end of the semicylindrical section 41b. The intermediate part in the circumferential direction of the engaging section 41d where the retaining piece 41e is located is planar except for the retaining hook 41f, which projects from this plane 41j.

Figure 5B:
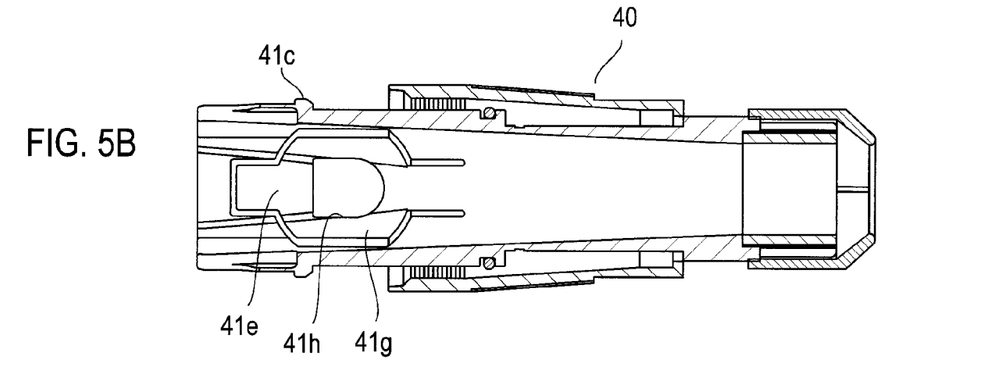
FIG. 5B is a horizontal cross-sectional view illustrating the plug shown in FIG. 4A.
Figure 5C:
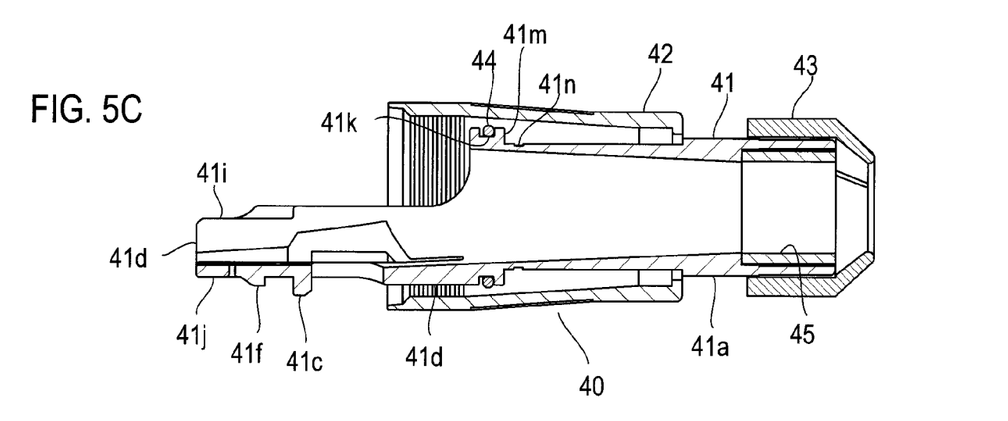
FIG. 5C is a vertical cross-sectional view illustrating the plug shown in FIG. 4A.

The coupling nut 42 is mounted on the outer circumference of the barrel 41 so as to surround the barrel 41. The diameter of the coupling nut 42 is slightly reduced at the rear end and threads 42a are formed on the inner circumferential surface at the end. In this example, the outer diameter of the coupling nut 42 at the end equals the outer diameter of the circular portion 32b of the flange 32 of the receptacle 30. The coupling nut 42 is movable in the axial direction of the barrel 41.

The O-ring 44 is sandwiched between the cylindrical body 41a of the barrel 41 and the coupling nut 42. The O-ring 44 is placed in a groove 41k formed in the outer circumference of the cylindrical body 41a, so the O-ring 44 is not exposed even if the coupling nut 42 is moved. The outer diameter of an intermediate part in the axial direction of the cylindrical body 41a is a little smaller and a step 41m formed at the end of the cylindrical body 41a prevents the coupling nut 42 from being disconnected. A groove 41n is formed annularly in the outer circumference of a part of the cylindrical body 41a, which is located slightly behind the step 41m.

On the other hand, the clamp nut 43 is screwed onto and attached to the rear end of the cylindrical body 41a of the barrel 41. The clamp nut 43 is screwed onto the outer circumference of the cylindrical body 41a, the rear end of the cylindrical body 41a is pressed inward, and the diameter is reduced. A cable seal 45 is disposed on the inner surface of the rear end of the cylindrical body 41a onto which the clamp nut 43 is screwed. The clamp nut 43 prevents the coupling nut 42 from being disconnected backward.

Figure 6A:
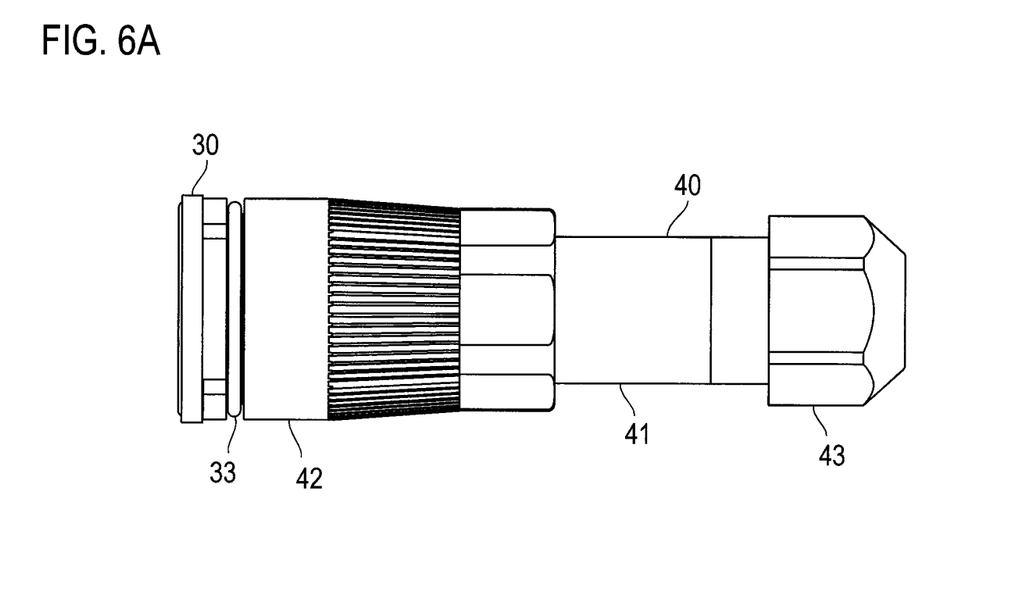
FIG. 6A is a front elevational view illustrating the connector in a state immediately before the plug shown in FIG. 2B is screwed onto and connected to the receptacle shown in FIG. 2A after the plug and the receptacle are temporarily retained to each other.
Figure 6B:
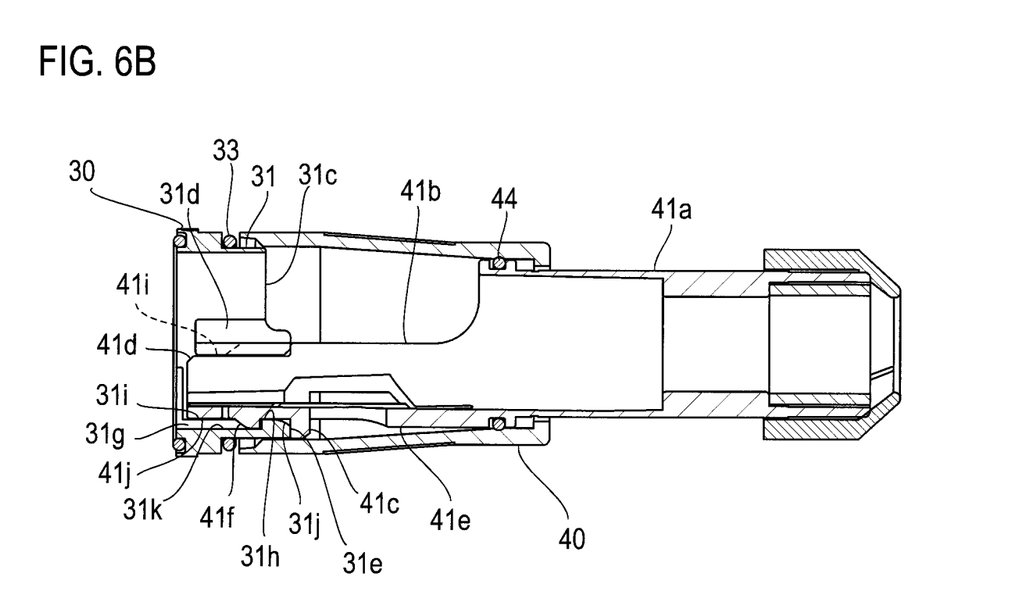
FIG. 6B is a vertical cross-sectional view illustrating the connector shown in FIG. 6A.

FIGS. 6A and 6B illustrate the connector in a state immediately before the plug 40 and the receptacle 30 as configured above are connected to each other after they are temporarily retained to each other. The engaging section 41d at the end of the barrel 41 of the plug 40 is engaged with and inserted into the hollow cylinder 31 of the receptacle 30 and the retaining piece 41e is caught in the receptacle 30. Insertion of the engaging section 41d into the hollow cylinder 31 of the receptacle 30 is performed before the screwing of the coupling nut 42 of the plug 40 onto the receptacle 30 so as to temporarily retain the plug 40 to the receptacle 30.

The engaging section 41d is positioned when both ends in the circumferential direction are clamped between the projecting sections 31d formed at two positions in the circumferential direction of the inner surface of the hollow cylinder 31 of the receptacle 30. The projecting sections 31d have a hook-shaped cross-section and its edge is bent in a direction opposite to the cutout 31c (that is, on a side on which the engaging section 41d is present) as described above, so both ends in the circumferential direction of the engaging sections 41d are clamped by the projecting sections 31d. Since the cutout 41i is formed in each of both ends in the circumferential direction at the end of the engaging section 41d, the engaging section 41d can be easily inserted between the projecting sections 31d at the two positions on the inner surface of the hollow cylinder 31.

The retaining hook 41f of the retaining piece 41e is placed in the recessed section 31k surrounded by the two ridges 31g and the coupling section 31h on the inner surface of the hollow cylinder 31 and is retained to the coupling section 31h, so that the retaining piece 41e is caught in the receptacle 30. The upper surfaces of the two ridges 31g and an upper surface of the coupling section 31h form a single plane 31i and the single plane 31i mates with a plane 41j located at an intermediate part in the circumferential direction of the engaging section 41d. Since an inclined plane 31j is formed at the end (front end) of the plane 31i, the retaining piece 41e having the retaining hook 41f can be easily inserted into the hollow cylinder 31. The engaging section 41d is inserted into the hollow cylinder 31 until the annular ridge 41c formed in the outer circumferential surface of the semicylindrical section 41b makes contact with the end surface 31e of the hollow cylinder 31.

As described above, in this example, the engaging section 41d engaged with and inserted into the hollow cylinder 31 is positioned by the two projecting sections 31d so that its motion is restricted, and the retaining hook 41f is placed in the recessed section 31k of the receptacle 30 to prevent disconnection. Such a structure significantly improves the retaining strength of the barrel 41 with respect to the receptacle 30 as compared with the related art in this example, the barrel 41 is not disconnected if an external force is applied in any directions, and the plug 40 can be temporarily retained to the receptacle 30 securely.

In a part with which the engaging section 41d is not engaged, the end of the hollow cylinder 31 of the receptacle 30 is largely opened upward by the cutout 31c and the semicylindrical section 41b of the barrel 41 is also largely opened upward, so a large opening through which the internal connectors can be seen is formed when the plug 40 is temporarily retained to the receptacle 30.

Figure 7A:
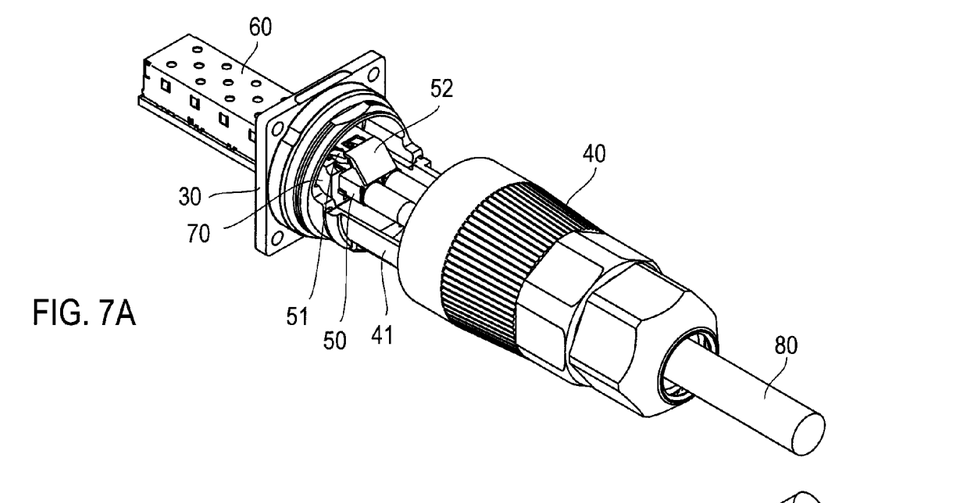
FIG. 7A is a perspective view illustrating the connector in a state where, in the plug and the receptacle that house internal connectors, the internal connectors are connected to each other and the plug and the receptacle are temporarily retained to each other.
Figure 7B:
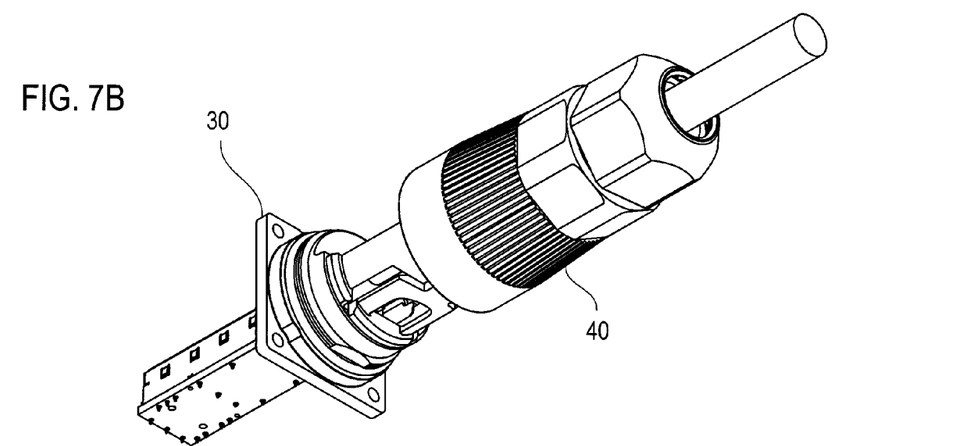
FIG. 7B is a perspective view, seen from below, illustrating the connector in a state where the plug and the receptacle shown in FIG. 7A are temporarily retained to each other.
Figure 7C:
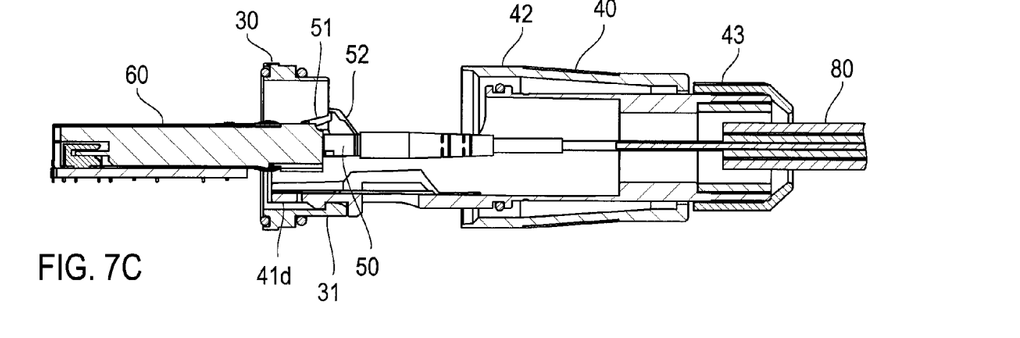
FIG. 7C is a cross-sectional view illustrating the connector in a state where the plug and the receptacle shown in FIG. 7A are temporarily retained to each other.
Figure 8A:
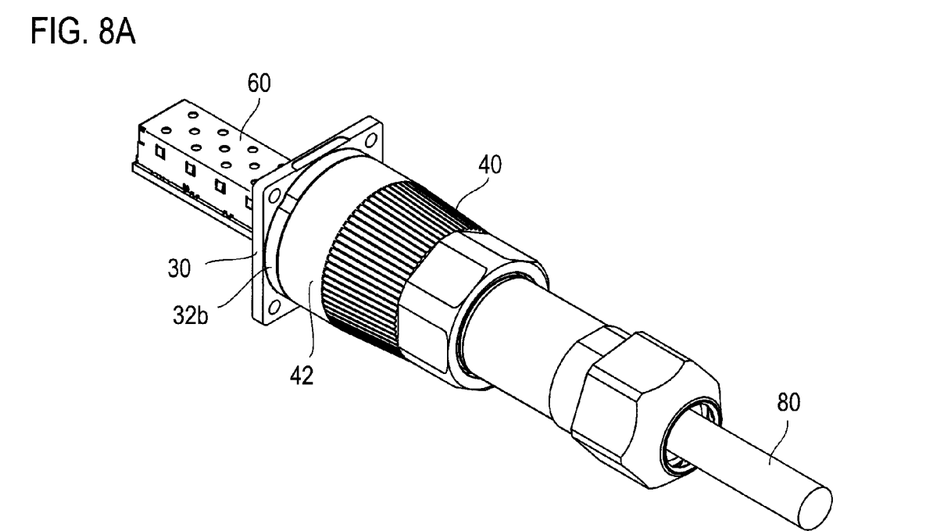
FIG. 8A is a perspective view illustrating the connector in a state where the plug and the receptacle that house the internal connectors are connected to each other.
Figure 8B:
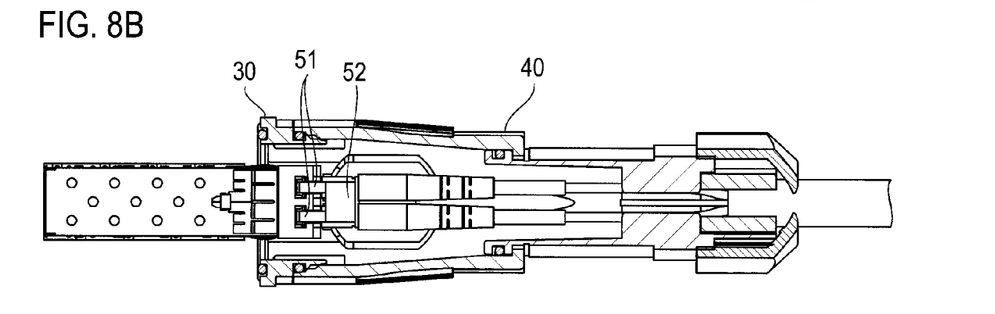
FIG. 8B is a horizontal cross-sectional view illustrating the connector shown in FIG. 8A in a state where the plug and the receptacle are connected to each other.
Figure 8C:
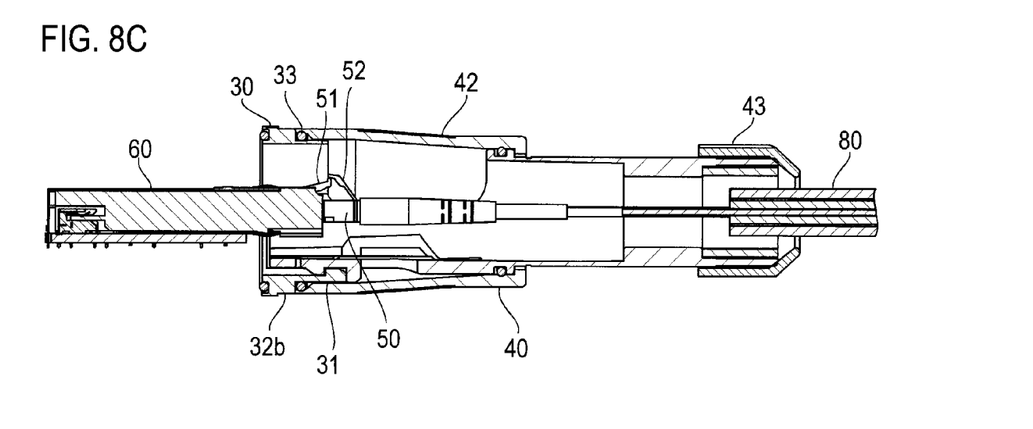
FIG. 8C is a vertical cross-sectional view illustrating the connector shown in FIG. 8A in a state where the plug and the receptacle are connected to each other.

FIGS. 7A to 7C show a state where the plug 40 and the receptacle 30 that house the internal connectors are temporarily retained to each other and the internal connectors are connected to each other. FIGS. 8A to 8C show a state where the coupling nut 42 is screwed onto the hollow cylinder 31 and the plug 40 and the receptacle 30 shown in FIGS. 7A to 7C are connected. The barrel 41 of the plug 40 houses an optical connector 50 and the receptacle 30 houses an optical connector 70 which is included a transceiver 60. The plug 40 and the receptacle 30 form an outer shell for the optical connectors 50 and 70. The optical connector 50 has a latch 51 for retaining to the optical connector 70 and a release lever 52 for releasing retaining by the latch 51.

The procedure for connecting the plug 40 to the receptacle 30 will be described below.

(1) First, loosen the clamp nut 43. This releases the pressed fixation of the optical cable 80 and frees the optical connector 50 from the plug 40.
(2) Connect the optical connector 50 to the optical connector 70. The latch 51 is inserted into the optical connector 70 and retained and the optical connector 50 and the optical connector 70 are connected.
(3) Insert the engaging section 41d into the receptacle 30 to temporarily retain the plug 40 to the receptacle 30.
(4) Screw the coupling nut 42 onto the receptacle 30 to retain it.
(5) Finally, tighten the clamp nut 43.

The procedure for connecting the plug 40 to the receptacle 30 is completed. The O-ring 33 disposed in the receptacle 30 is clamped by the coupling nut 42.

On the other hand, the procedure for disconnecting the plug 40 will be described below.

(1) Loosen the coupling nut 42 and remove it from the receptacle 30.

(2) Pull out the plug 40 while applying a pressing force to the wide area 41g of the retaining piece 41e in which the window 41h is formed and the release lever 52 of the optical connector 50 so that they are pressed inward, more specifically while pressing the retaining piece 41e and the release lever 52 from outside. This releases the retaining by the latch 51 with the release lever 52 and the retaining by the retaining piece 41e at the same time, the optical connector 50 is disconnected from the optical connector 70, the plug 40 is disconnected from the receptacle 30, and the removal is completed.

The embodiment of the present invention is described above. The major points and advantages of the embodiment will be described below.

(a) The engaging section 41d, which is substantially semicylindrical, is inserted into the receptacle 30, both ends in the circumferential direction are clamped between the projecting sections 31d at the two position for positioning and fixation, the retaining piece 41e is retained, and the plug 40 is therefore temporarily retained. This significantly improves the retaining strength during temporary retaining and makes the connection and disconnection of the internal connectors and the screwing of the coupling nut 42 easy and safe.

(b) The retaining piece 41e of the plug 40 is located opposite to the release lever 52, which releases retaining between the optical connector 50 housed in the barrel 41 and the counterpart optical connector 70, in the diameter direction of the barrel 41. Accordingly, the release lever 52 and the retaining piece 41e can be pressed by one hand from both sides. Pulling out the plug 40 while pressing the release lever 52 and the retaining piece 41e by one hand when disconnecting the plug 40 from the receptacle 30 significantly facilitates the disconnection.

(c) The retaining piece 41e has the large window 41h through which the optical connector 50 and fingers can be seen. Accordingly, operations such as pressing the release lever 52 of the optical connector 50 can be performed easily during disconnection.

(d) The projecting sections 31d for clamping the engaging section 41d are formed so as to face each other in the hollow cylinder 31 of the receptacle 30. Accordingly, the projecting sections 31d prevents the engaging section 41d from being inserted incorrectly.

(e) The cutout 41i is disposed at each of both ends of the engaging section 41d. Accordingly, the engaging section 41d can be easily inserted between the projecting sections 31d so that both ends in the circumferential direction of the engaging section 41d are clamped.

(f) The large cutouts are provided in the barrel 41 and the hollow cylinder 31 of the receptacle 30 to form a large opening. This facilitates the connection and disconnection of the optical connectors 50 and 70.

(g) The marker 32e is provided on the flange 32 of the receptacle 30. This indicates the position of the cutout 31c of the hollow cylinder 31, more specifically the direction in which the optical connectors 50 and 70 can be visually recognized, thereby facilitating, for example, the positioning of the worker who disconnects the optical connectors 50 and 70.

(h) The groove 41n that is exposed upon completion of the screwing of the coupling nut 42 is provided in the outer circumference of the barrel 41. Accordingly, the completion of the screwing can be determined by visually checking the groove 41n.

(i) The screw head of the screw for retaining the flange 32 of the receptacle 30 to a panel etc. is accommodated within the thickness of the flange 32. This prevents interference with the coupling nut 42 or injury from the screw head.

(j) The receptacle 30 includes the O-rings 33 and 34 and the plug 40 includes the O-ring 44 and the cable seal 45. This achieves the water-proof structure of the connector including the plug 40 and the receptacle 30.

(k) When waterproof tape is wound around the plug 40 and the receptacle 30 after the coupling nut 42 is screwed, waterproof tape can be wound appropriately and efficiently to improve water proofing properties because the flange 32 has the circular portion 32b in this example so that the external diameter of the circular portion 32b equals the external diameter at the end of the coupling nut 42.

In the above embodiment, optical connectors such as standardized LC connectors, SC connectors, etc. are used as the internal connectors. The internal connectors are not limited to such optical connectors and electric connectors may also be used.

What is claimed is:

1. A connector including a plug capable of housing one internal connector as an outer shell and a receptacle capable of housing another internal connector as an outer shell, the plug and the receptacle being connected to each other, the one internal connector and the other internal connector being connected to each other, wherein the receptacle includes a hollow cylinder and a flange formed at one end of the hollow cylinder, the plug includes
a barrel having a cylindrical body, a semicylindrical section extending from the body, the semicylindrical section shaped by partially cutting out a cylinder of the body, and an engaging section provided at an end of the semicylindrical section and
a coupling nut mounted on an outer circumference of the barrel, the coupling nut movable in an axial direction of the barrel, wherein
a boom-like retaining piece having a fixed end on a side of the body is cut out and formed in the semicylindrical section,
a retaining hook is formed at an idle end of the retaining piece located in the engaging section, the retaining hook projecting from an outer circumference of the engaging section,
the plug and receptacle are connected to each other when the coupling nut is screwed onto threads formed on an outer circumference of the hollow cylinder, and
the engaging section is engaged with and inserted into the hollow cylinder so as to be positioned on an inner surface of the hollow cylinder before the plug and receptacle are connected and the retaining piece is caught in the receptacle by the retaining hook, so that the plug is temporarily retained to the receptacle, and wherein the one internal connector has a release lever for releasing retaining to the other internal connector, the barrel houses the one internal connector having the release lever, the retaining piece is located opposite to the release lever in a diameter direction of the barrel in a state where the internal connectors are retained and connected to each other and the retaining piece is caught in the receptacle, and releasing of retaining by the retaining piece is performed concurrently with releasing of retaining with the release lever by applying a pressing force to the retaining piece and the release lever so that the retaining piece and the release lever are pressed inward.

2. The connector according to claim 1, wherein
an annular ridge that makes contact with an end surface of the hollow cylinder is formed on an outer circumferential surface of the semicylindrical section and
a part ahead of the annular ridge is the engaging section.

3. The connector according to claim 2, wherein a window is formed in the retaining piece, the window being located between the annular ridge and the fixed end.

4. The connector according to claim 3, wherein a section in the retaining piece where the window is formed is wider than a section in the retaining piece where the window is not formed.

5. The connector according to claim 1, wherein both ends in a circumferential direction of the engaging section are clamped between projecting sections formed at two positions in a circumferential direction of the inner surface of the hollow cylinder so that the engaging section is positioned.

6. The connector according to claim 5, wherein the projecting sections are shaped so as to clamp both ends in the circumferential direction of the engaging section.

7. The connector according to claim 5, wherein a cutout is formed at each of both ends in the circumferential direction of the engaging section, the cutout being formed at an end of the engaging section.

8. The connector according to claim 6, wherein a cutout is formed at each of both ends in the circumferential direction of the engaging section, the cutout being formed at an end of the engaging section.

9. The connector according to claim 1, wherein
two ridges extending on the inner surface of the hollow cylinder in an axial direction of the hollow cylinder and
a coupling section coupling the two ridges at an edge of the hollow cylinder are formed and
the retaining hook is located in a recessed section surrounded by the two ridges and the coupling section so that the retaining piece is retained.

10. The connector according to claim 9, wherein
upper surfaces of the two ridges and an upper surface of the coupling section form a single plane and
a part of the engaging section that is engaged with and inserted into the single plane is planar except for the retaining hook.

11. The connector according to claim 10, wherein an inclined plane is formed on a marginal side of the single plane from which the engaging section is inserted.

12. The connector according to claim 1, wherein a part at the end of the hollow cylinder to which the engaging section is not inserted is cut out.

13. The connector according to claim 12, wherein a marker indicating a position of the cut out part in the hollow cylinder is provided on the flange.

14. The connector according to claim 1, wherein
the flange includes a square portion and a circular portion placed inward of the square portion and
an outer diameter of the circular portion equals an outer diameter of the coupling nut.

15. The connector according to claim 1, wherein an O-ring is clamped between the body and the coupling nut.

16. The connector according to claim 1, wherein a groove that exposes when the coupling nut is screwed onto and connected to the threads of the hollow cylinder is formed in an outer circumferential surface of the body.

17. The connector according to claim 1, wherein an O-ring clamped by the coupling nut is placed at a base of the hollow cylinder.

* * * * *